(12) United States Patent
Horikawa et al.

(10) Patent No.: US 7,274,644 B2
(45) Date of Patent: Sep. 25, 2007

(54) INFORMATION RECORDING DEVICE AND INFORMATION RECORDING METHOD

(75) Inventors: Kunihiko Horikawa, Tokorozawa (JP); Akira Shirota, Tokorozawa (JP); Masahiro Kato, Tokorozawa (JP); Eiji Muramatsu, Tokorozawa (JP); Shoji Taniguchi, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 20 days.

(21) Appl. No.: 10/525,766

(22) PCT Filed: Aug. 27, 2003

(86) PCT No.: PCT/JP03/10861

§ 371 (c)(1),
(2), (4) Date: Feb. 28, 2005

(87) PCT Pub. No.: WO2004/021338

PCT Pub. Date: Mar. 11, 2004

(65) Prior Publication Data

US 2006/0007832 A1  Jan. 12, 2006

(30) Foreign Application Priority Data

Aug. 29, 2002 (JP) .............................. 2002-252187

(51) Int. Cl.
*G11B 20/10* (2006.01)

(52) U.S. Cl. ................................. 369/59.12; 369/59.11

(58) Field of Classification Search ............. 369/59.11, 369/59.12

See application file for complete search history.

(56) References Cited

U.S. PATENT DOCUMENTS

| | | | | |
|---|---|---|---|---|
| 5,327,411 A * | 7/1994 | Iwasa et al. | ............. | 369/59.12 |
| 6,269,060 B1* | 7/2001 | Harvey et al. | ........... | 369/47.28 |
| 6,657,935 B2* | 12/2003 | Eguchi et al. | ............. | 369/59.1 |
| 2001/0043531 A1* | 11/2001 | Sato et al. | ............... | 369/53.14 |
| 2003/0021204 A1* | 1/2003 | Kashihara | ................ | 369/47.51 |
| 2003/0090981 A1* | 5/2003 | Yokoi | ...................... | 369/59.11 |
| 2003/0142603 A1* | 7/2003 | Nakajo | ..................... | 369/53.2 |
| 2003/0202429 A1* | 10/2003 | Miyaoka | .................. | 369/13.27 |
| 2004/0100885 A1* | 5/2004 | Nakamura et al. | ........ | 369/47.51 |
| 2006/0140097 A1* | 6/2006 | Tasaka et al | ............. | 369/59.11 |
| 2006/0245328 A1* | 11/2006 | Ahn et al. | ............... | 369/59.11 |

FOREIGN PATENT DOCUMENTS

| | | |
|---|---|---|
| JP | 03-022223 | 1/1991 |
| JP | 5-012670 | 1/1993 |
| JP | 5-143993 | 6/1993 |
| JP | 2643780 | 5/1997 |
| JP | 11-102523 | 4/1999 |
| JP | 11102523 A * | 4/1999 |

* cited by examiner

Primary Examiner—Thang V. Tran
Assistant Examiner—Linh T. Nguyen
(74) Attorney, Agent, or Firm—Young & Thompson

(57) ABSTRACT

When a bias power level of a recording pulse waveform is varied entirely or partially, a shape of the recording pulse wave form is varied according to the variation. For example, when the bias power level is increased, a width or an edge position of a top pulse or a multi-pulse of the recording pulse waveform is varied correspondingly. Thereby, a total heat quantity of a recording laser light is not increased, and a preferable recording characteristic is maintained.

9 Claims, 8 Drawing Sheets

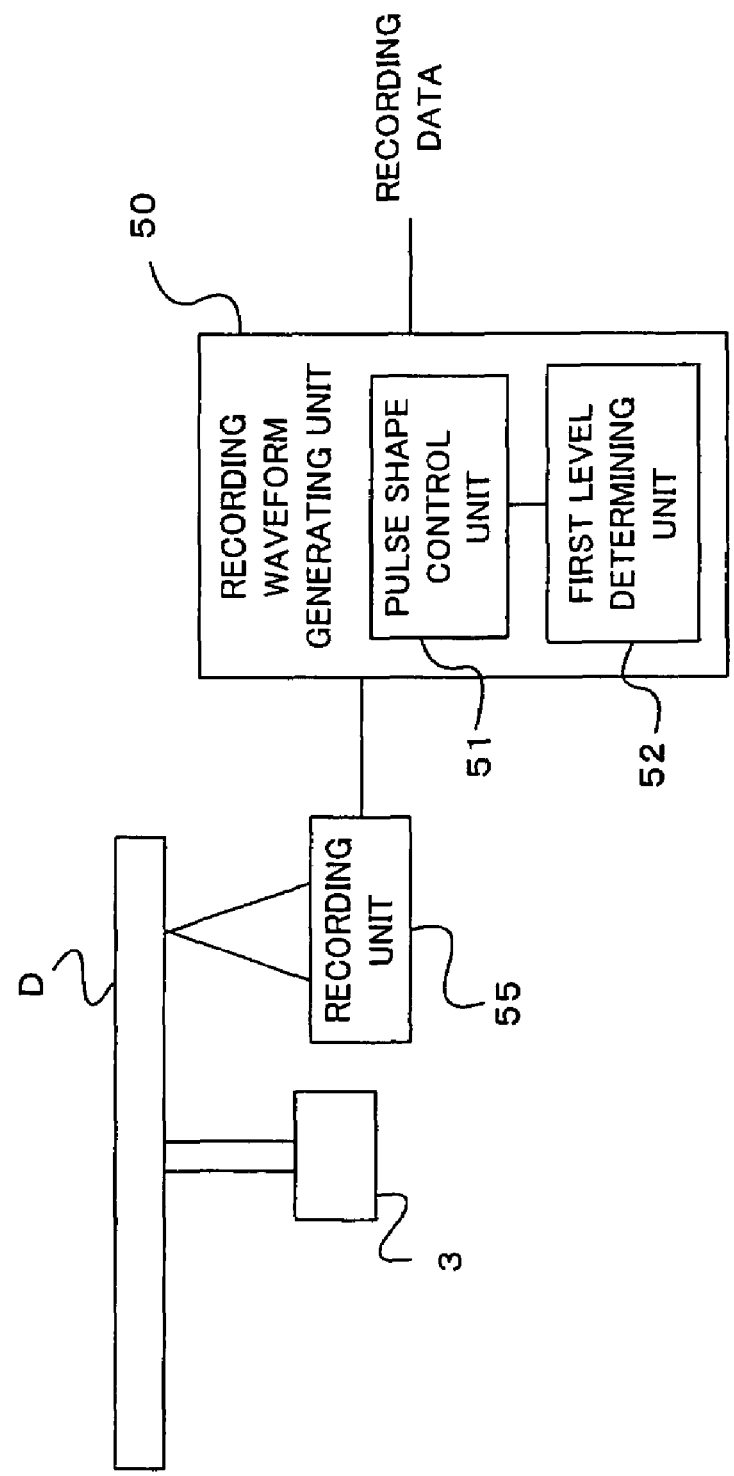

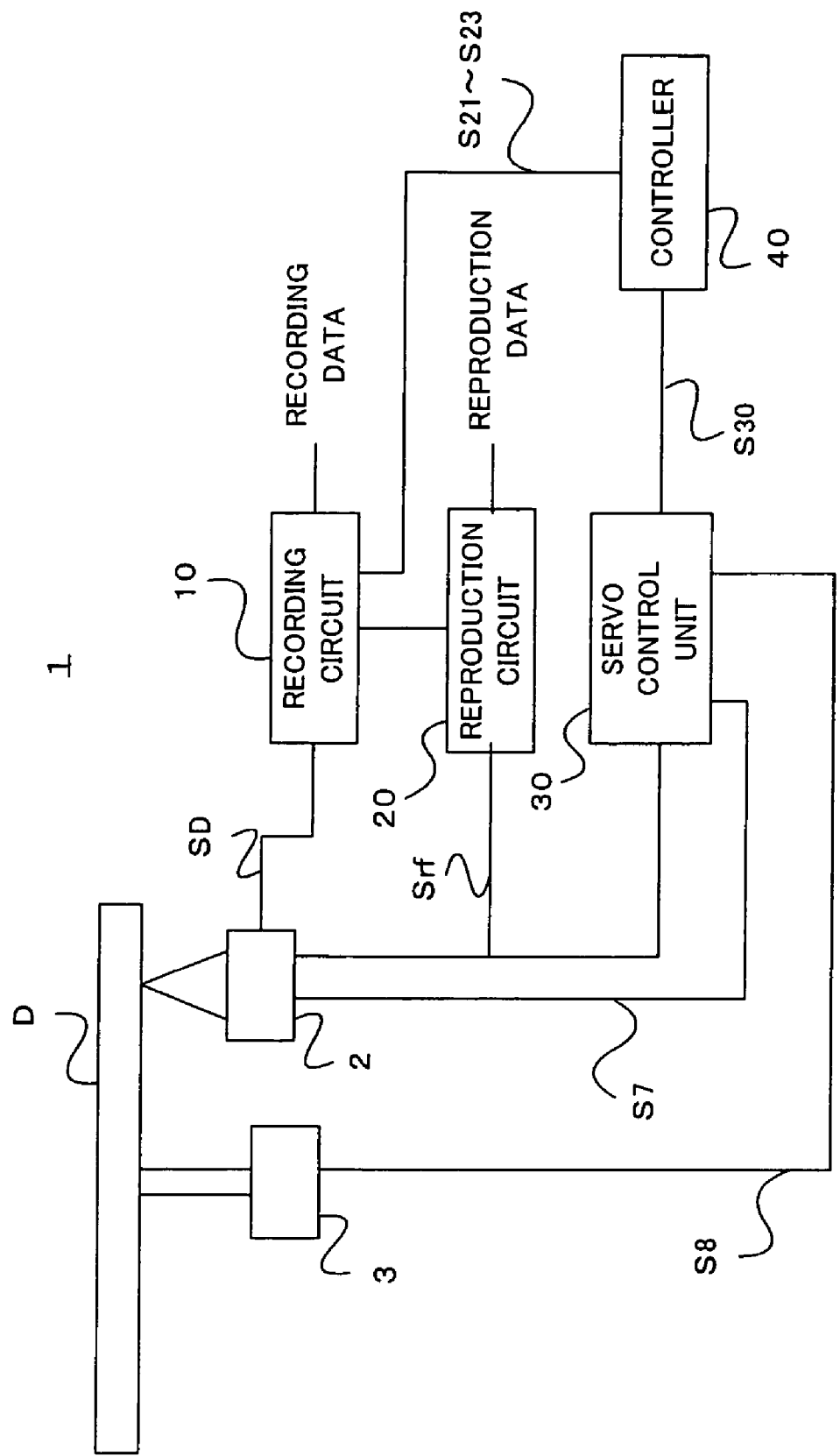

INFORMATION RECORDING DEVICE AND INFORMATION RECORDING METHOD

TECHNICAL FIELD

This invention relates to a technique for recording information on an optical disc using a laser light or other means.

BACKGROUND TECHNIQUE

Onto a recordable or rewritable optical disc such as a DVD-R (DVD-Recordable) or a DVD-RW (DVD-Rerecordable), information is recorded thereon by irradiating a laser light on its recording surface. At the areas on the recording surface of the optical disc where the laser light is irradiated, the property of the optical recording medium forming the optical disc is physically changed because of the increased temperature. This produces recording marks on the recording surface.

Namely, the laser light is modulated by recording pulses having time widths corresponding to information to be recorded, so that the laser pulses having lengths corresponding to information to be recorded are generated and irradiated on the optical disc. Thus, recording marks having lengths corresponding to the information to be recorded can be formed on the optical disc.

One approach recently used is to form a recording mark by a pulse train having a plurality of short pulses, rather than by a single laser pulse. This approach, called "write strategy", introduces less heat accumulation on the recording surface of the optical disc compared to the approach irradiating a single recording laser pulse. Therefore, uniform temperature distribution can be achieved on the recording surface on which the recording marks are formed. This can prevent undesired tear drop-shaped recording marks from being formed, and enables the formation of the recording marks of preferred shape.

In the case of DVD-R, for example, the recording pulse train consists of a plurality of pulses which magnitudes varying between a certain bias power level and write power level. That is, based on recording data, the areas on the recording surface of the optical disc where no recording marks are to be formed (referred to as "space periods" hereafter) are irradiated with the laser light of the bias power. The areas on the recording surface of the optical disc where recording marks are to be formed (referred to as "mark periods" hereafter) are irradiated with the laser light of the power corresponding to the recording pulse train having magnitudes varying between the bias power and the write power. Consequently, the recording marks are formed on the recording surface.

Though the bias power level in the recording pulse is prescribed by a DVD-R standard and the like, the bias power level different from a prescribed value may be used in a drive apparatus of the optical disc. For example, at the time of recording the information, during the period in which no recording mark is formed, a gain control of a recording laser power and various kinds of servo controls are executed by using the bias power level. Therefore, it can be thought that the bias power level is set to be higher than the prescribed value in order to stabilize the control of the laser power and the servo control. On the contrary, it is preferable that the bias power level is low in terms of improving the recording characteristic of the information by the recording pulse. Therefore, it can be thought that the bias power level is set to be lower than the prescribed value.

However, when the bias power level is varied, there is such a problem that the optimum recording characteristic cannot problematically be obtained even if the recording is performed by the write strategy designated in advance.

DISCLOSURE OF INVENTION

It is an object of the present invention to provide an information recording apparatus and an information recording method capable of obtaining a preferable recording characteristic even when a bias power level of a recording pulse waveform to an optical disc is varied.

According to one aspect of the present invention, there is provided an information recording apparatus which irradiates a laser light on a recording medium and forms recording marks corresponding to recording data, including: a light source which emits the laser light; a recording waveform generating unit which generates a recording pulse waveform varying between a first level and a second level based on the recording data; and a recording unit which drives the light source based on the recording pulse waveform to form the recording marks on the recording medium, wherein the recording waveform generating unit adjusts an edge position of a pulse portion having the second level in the recording pulse waveform in accordance with the first level.

The recording waveform generating unit may include: a level determining unit which determines the first level; and an adjustment unit which compares the first level with a predetermined reference level, and adjusts the edge position based on a comparison result.

The adjustment unit may shift a front edge of the pulse portion backward when the first level is higher than the reference level, and may shift the front edge of the pulse portion forward when the first level is lower than the reference level.

The recording pulse waveform may include a top pulse, and the recording waveform generating unit may adjust a front edge position of the top pulse.

The recording pulse waveform may further include one or more multi-pulse, and the recording waveform generating unit may adjust a front edge position of each multi-pulse.

The recording waveform generating unit may adjust the edge position of the pulse portion to vary a pulse width of the pulse portion.

The recording pulse waveform may include one top pulse and one or more multi-pulse, and the recording waveform generating unit may adjust the front edge position of the top pulse in accordance with a level in a period before the top pulse, and may adjust each front edge position of the plural multi-pulses in accordance with the level between the plural multi-pulses.

According to another aspect of the present invention, there is provided an information recording method which is executed in an information recording apparatus which irradiates a laser light on a recording medium to form recording marks according to recording data, including: a recording waveform generating process which generates a recording pulse waveform varying between a first level and a second level based on the recording data; and a recording process which drives a light source based on the recording pulse waveform to form the recording marks on the recording medium, wherein the recording waveform generating process adjusts an edge position of a pulse portion having the second level in the recording pulse waveform in accordance with the first level.

BRIEF DESCRIPTION OF THE DRAWINGS

FIG. 2 is a block diagram schematically showing a configuration of an information recording apparatus according to the embodiment of the present invention;

FIG. 3 is a block diagram schematically showing a configuration of an information recording and reproducing apparatus according to the embodiment of the present invention;

DETAILED DESCRIPTION OF THE PREFERRED EMBODIMENTS

The preferred embodiments of the present invention will now be described below with reference to the attached drawings.

The embodiment of the present invention is characterized in that a shape of the pulse in the recording pulse waveform is varied in accordance with variation of the bias power of the recording pulse waveform. Thereby, the variation of the recording characteristic by the variation of the bias power is suppressed. The variation of the shape of the recording pulse waveform is performed by the variation of the pulse width and the movement of the edge position of the pulse, for example.

Figure 1A:
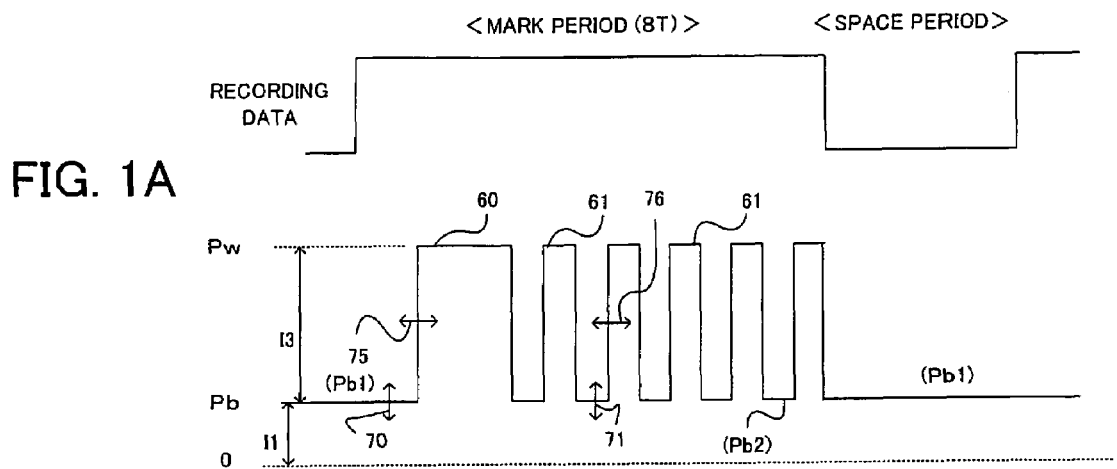
FIGS. 1A and 1B schematically show a relation between variation of a bias power and a shape of a recording pulse waveform according to an embodiment of the present invention.

The description will be given of a basic technique of the present embodiment with reference to FIGS. 1A and 1B. FIG. 1A shows an example of the recording pulse waveform of the so-called multi-pulse type. The recording pulse waveform of the multi-pulse type basically has a top pulse 60, and pulses 61 (hereinafter also referred to as "multi-pulse") of a number corresponding to the recording data length. A group of the plural multi-pulses 61 is called "multi-pulse portion". Dependently on the write strategy, the short recording data such as 3T and 4T sometimes has only the top pulse and no multi-pulse portion.

As shown in FIG. 1A, the laser power varies between a bias power level Pb and a write power level Pw. In FIG. 1A, the bias power level includes a bias power level corresponding to the space period and a bias power level between the pulses 61 of the multi-pulse portion. Hereinafter, by defining that the bias power level in the space period is Pb1 and the bias power level in the multi-pulse portion is Pb2, the two bias power levels are sometimes distinguished.

In the recording pulse waveform shown in FIG. 1A, when the bias power level Pb1 in the space period is varied (see an arrow 70), the front edge position of the top pulse 60 is varied (see an arrow 75) in accordance with the variation quantity. Concretely, when the bias power level Pb1 in the space period is increased, the front edge of the top pulse 60 is shifted backward (in the right direction of FIG. 1A) by the predetermined quantity. When the bias power level Pb1 is decreased, the front edge of the top pulse 60 is shifted forward. By shifting the front edge position of the top pulse 60, even when the bias power level is varied, the recording power applied to the disc as a whole becomes equal.

In addition, in FIG. 1A, when the bias power level Pb2 of the multi-pulse portion is varied (see an arrow 71), the front edge position of the multi-pulse 61 in the multi-pulse portion is varied (see an arrow 76) in accordance with the variation quantity. Concretely, when the bias power level Pb2 is increased, the front edge of the pulse 61 in the multi-pulse portion is shifted backward (in the right direction of FIG. 1A) by the predetermined quantity. When the bias power level Pb2 is decreased, the front edge of the pulse 61 is shifted forward. By shifting the front edge position of the pulse 61 in the multi-pulse portion, even when the bias power level is varied, the recording power applied on the disc as whole becomes equal.

Figure 1B:
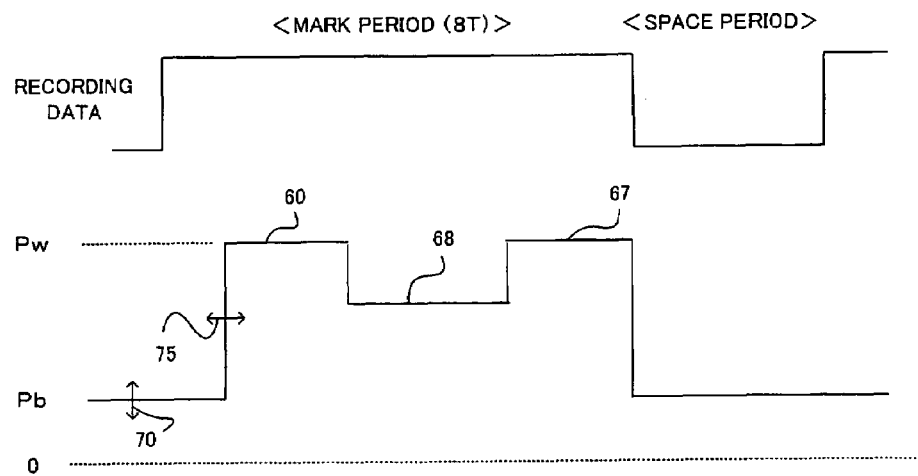

FIG. 1B shows an example of the recording pulse waveform of the non-multi-pulse type. The recording pulse waveform of the non-multi-pulse type includes the top pulse 60, a last pulse 67 and an intermediate bias portion 68 between both of them. In a case of the recording pulse waveform of such the non-multi-pulse type, the variation method of the pulse shape is basically similar to the case of the recording pulse waveform of the multi-pulse type. Namely, when the bias power level Pb1 is varied (see the arrow 70), in accordance with the variation quantity, the front edge position of the top pulse 60 is varied (see the arrow 75).

As described above, in the present embodiment, by shifting the front edge position of the top pulse and/or the pulse of the multi-pulse portion backward and forward in accordance with the variation of the bias power level, the sum of the laser power irradiated on the disc by the recording pulse is maintained to be constant, and deterioration of the recording characteristic is prevented.

FIG. 2 schematically shows a configuration of the information recording apparatus according to the present embodiment. In FIG. 2, the information recording apparatus includes a recording waveform generating unit 50 and a recording unit 55. The recording waveform generating unit 50 receives the recording data, and generates the recording pulse signal correspondent to the inputted recording data in accordance with predetermined strategy information to supply it to the recording unit 55. The recording unit 55 has a pickup and the like, for example. The recording unit 55 drives the laser driver in accordance with the inputted recording pulse signal, and generates the recording light to irradiate it on a disc D. In such a way, the recording mark having a length corresponding to the recording data is formed on the disc D.

The recording waveform generating unit 50 includes a pulse shape control unit 51 and a first level determining unit 52. A first level is the bias power level shown in FIGS. 1A and 1B, and is a concept including both of the bias power level Pb1 in the space period and the bias power level Pb2 in the multi-pulse portion. On the contrary, a second level is the write power level Pw.

When the recording pulse waveform is generated in accordance with the specific write strategy shown in FIGS. 1A and 1B, the first level determining unit 52 determines the bias power level. The concrete determination of the bias power level is different dependently on various kinds of characteristics of the information recording apparatus and a drive apparatus to which the present embodiment is applied. In a certain drive apparatus, the bias power level Pb may be set to be high, and in another drive apparatus, the bias power level Pb may be set to be low. In a certain drive apparatus, the bias power level Pb1 in the space period can be set to be high, and the bias power level Pb2 in the multi-pulse portion can be set to be low (or can be conversely set).

In accordance with the first level determined by the first level determining unit 52, i.e., the bias power level Pb (in some cases, Pb1 and Pb2), the pulse shape control unit 51 varies the pulse shape in the recording pulse waveform. Concretely, as described above, the pulse shape control unit 51 executes a process as follows. In accordance with increasing/decreasing of the bias power level Pb1 in the space period, the front edge position of the top pulse 60 is shifted backward/forward, and in accordance with increasing/decreasing of the bias power level Pb2 in the multi-pulse portion, the front edge position of each multi-pulse 61 in the multi-pulse portion is shifted backward/forward. Thus, the sum of the heat given to the disc is not varied by the variation of the bias power level, and the stable recording is performed.

Next, the description will be given of the specific embodiment of the present invention.

[Configuration of Information Recording and Reproducing Apparatus]

Next, the description will be given of a configuration of an information recording and reproducing apparatus to which the above-mentioned recording pulse waveform is applied. FIG. 3 schematically shows an entire configuration of the information recording and reproducing apparatus according to the specific embodiment of the invention. An information recording and reproducing apparatus 1 records information on an optical disc D and reproduces information from the optical disc D. For example, the optical disc D may be a CD-R (Compact Disc-Recordable) and a DVD-R for recording only once, and a CD-RW (Compact Disc-Rewritable) and a DVD-RW that allow for repeated erasing and recording of information. It is assumed that the optical disc D is a DVD-R in an explanation below.

The information recording and reproducing apparatus 1 includes an optical pickup 2 for irradiating a recording beam and a reproduction beam to the optical disc D, a spindle motor 3 for controlling rotation of the optical disc D, a recording circuit 10 for controlling recording of information on the optical disc D, a reproduction circuit 20 for controlling reproduction of information recorded on the optical disc D, a servo control unit 30 for various kinds of servo controls, and a controller 40. The servo controls include a spindle servo for controlling rotation of the spindle motor 3, a focus servo and a tracking servo for controlling a relative position of the optical pickup 2 with respect to the optical disc D and a tilt servo.

The recording circuit 10 receives recording data. Then, the recording circuit 10 generates a driving signal $S_D$ for driving a laser diode in the optical pickup 2 and supplies it to the optical pickup 2.

The reproduction circuit 20 receives a read-out signal Srf outputted from the optical pickup 2 and performs predetermined processing on read-out signal Srf, such as demodulation and decoding, to generate and output reproduction data.

The servo control unit 30 receives the read-out signal Srf from the optical pickup 2. Based on the signal Srf, the servo control unit 30 supplies a servo signal S7 such as a tracking error signal and a focus signal to the optical pickup 2 and supplies a spindle servo signal S8 to the spindle motor 3. Thus, various kinds of servo processing are performed, such as the tracking servo, the focus servo, and the spindle servo.

Since the invention mainly relates to the recording operations in the recording circuit 10 and various known methods can be applied to the reproduction control and the servo control, these controls will not be described in detail.

The controller 40 forms the recording pulse waveform, and supplies, to the recording circuit 10, various kinds of control signals S21 to S23 which will be described later. Further, the controller 40 supplies, to the servo control unit 30, a signal S30 showing a recording speed of information, i.e., normal speed recording, double speed recording or 4-times higher speed recording.

In addition, although FIG. 3 illustrates the information recording and reproducing apparatus as a specific embodiment of the invention, the invention may also be applied to an information recording apparatus dedicated to recording.

Figure 4:
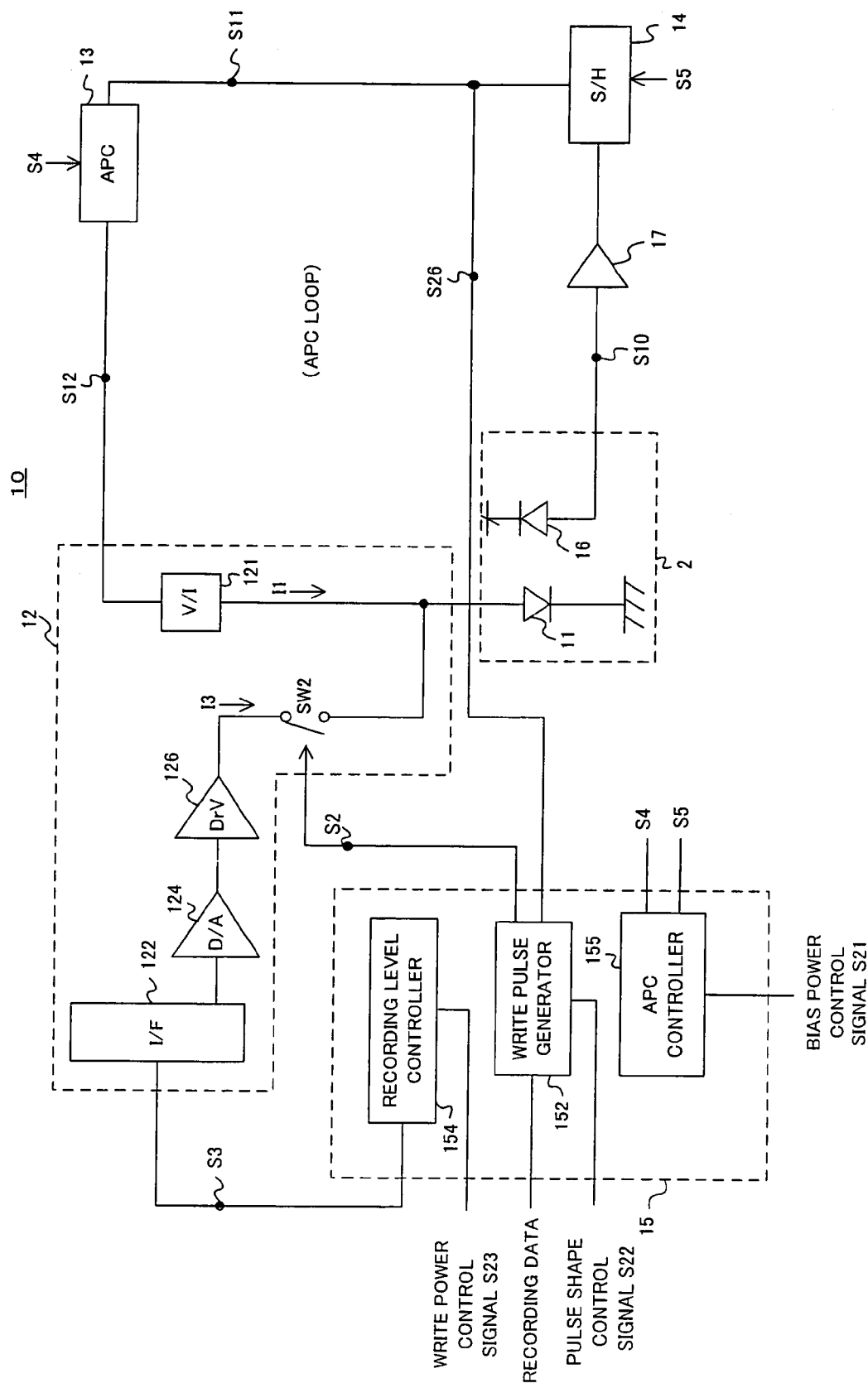
FIG. 4 is a block diagram showing a configuration of a pickup and a recording circuit shown in FIG. 3.

FIG. 4 shows an internal configuration of the optical pickup 2 and the recording circuit 10. As shown in FIG. 4, the optical pickup 2 includes a laser diode (LD) 11 which generates the recording beam for recording information on the optical disc D and the reproduction beam for reproducing information from the optical disc D, and a front monitor diode (FMD) 16 which receives the laser light emitted by the laser diode 11 and outputs a laser power level signal S10 corresponding to the laser light.

The optical pickup 2 further includes known components, which will not be shown or described in detail. These components include a photo-detector which receives a reflection beam of the reproduction beam reflected from the optical disc D and generates the read-out signal Srf, and an optical system which guides the recording beam, the reproduction beam and the reflection beam to appropriate directions.

The recording circuit 10 includes a laser diode (LD) driver 12, an APC (Automatic Power Control) circuit 13, a sample-and-hold (S/H) circuit 14, a controller 15, and a buffer 17.

The LD driver 12 supplies a current corresponding to the recording data to the laser diode (LD) 11, and performs the recording of the information on the optical disc D.

As shown in FIG. 4, the LD driver 12 includes a voltage-to-current (V/I) converter 121, an interface (I/F) 122, a D/A converter 124, a driver 126, and a switch SW2.

The sample-and-hold circuit 14 samples and holds the level of the laser power level signal S10 at the timing prescribed by a sample-and-hold signal S5.

The APC circuit 13 performs the power control of the LD driver 12 based on a signal S11 outputted from the sample-and-hold circuit 14. Specifically, in the case of DVD-R, the APC circuit 13 controls the LD driver 12 so that the bias power level Pb of the laser light emitted by the laser diode 11 is maintained constant.

The controller 15 mainly performs recording operation and APC control. As shown in FIG. 4, the controller 15 includes a write pulse generator 152, a recording level controller 154 and an APC controller 155.

The write pulse generator 152 generates a switching signal S2 of the switch SW2 in the LD driver 12 on the basis of the inputted recording data. The pulse-shape control signal S22 is supplied from the controller 40 to the write pulse generator 152. The pulse-shape control signal S22 is generated by the controller 40, and shows the shapes of the top pulse/multi pulse in the recording pulse signal in accordance with the variation of the bias power level Pb, more concretely shows the variation quantity of the front edge position. Therefore, the write pulse generator 152 varies the front edge positions of the top pulse and/or the multi pulse in the recording pulse signal based on the pulse-shape control signal S22.

An emission level signal S26 outputted from the sample-and-hold circuit 14 is supplied to the write pulse generator 152.

The recording level controller 154 generates a recording level signal S3 for determining the write power level on the basis of the write power control signal S23 inputted from the controller 40 to supply it to the interface (I/F) 122 of the LD driver 12. The write power control signal S23 shows the level of the write power Pw (see FIGS. 1A and 1B).

The APC controller 155 generates an APC target value S4 which is a target value for servo control performed by an APC loop to supply it to the APC circuit 13. The APC controller 155 also supplies, to the sample-and-hold circuit 14, a sample-and-hold signal S5 which indicates the sampling and holding timings of the sample-and-hold circuit 14. The target value of the servo control performed by the APC loop is basically the bias power level Pb (see FIGS. 1A and 1B), and the controller 40 generates the bias power control signal S21 indicating the bias power level Pb to supply it to the APC controller 155. Based on the bias power control signal S21, the APC controller 155 determines the APC target value S4. Therefore, the APC loop follows the bias power level Pb designated by the controller 40.

Although the sample-and-hold circuit 14 is used for forming the APC loop in the above configuration, a bottom hold circuit may be used instead of the sample-and-hold circuit 14. In that case, the APC servo may be performed by using a bottom value of the laser power level signal S10 outputted from the front monitor diode 16.

[Recording Operation]

Next, the description will be given of recording control performed by the recording circuit 10 shown in FIG. 4 using the optical pickup 2. The recording circuit 10 performs the recording control and the APC control.

(I) Recording Control

First, the recording control will be described. It is noted that the description is first directed to the case of DVD-R. In the recording operation, the recording level controller 154 in the controller 15 supplies, to the LD driver 12, the recording level signal S3 for generating a current I3. The current I3 is used to create the write power level Pw of the recording pulse waveform shown in FIG. 1A.

The recording level signal S3 is supplied to the D/A converter 124 through the I/F 122 in the LD driver 12. The D/A converter 124 generates a correspondent analog signal, and drives the driver 126 by the analog signal to generate the current I3 and supply it to the switch SW2.

The write pulse generator 152 in the controller 15 generates a write pulse signal which consists of a plurality of pulse trains based on the recording data shown in FIG. 1A, and supplies it to the LD driver 12 as the switching signal S2.

In the LD driver 12, the current I1 is supplied from the V/I converter 121 to the laser diode 11. As shown in FIG. 1A, the current I1 defines the bias power level Pb of the recording pulse signal.

Referring to FIG. 1A, in the mark period, the switch SW2 is controlled by the switching signal S2 identical to the write pulse signal. Therefore, the switch SW2 is turned on in accordance with the write pulse signal, and the current I3 is supplied to the laser diode 11 intermittently. As a result, as shown in FIG. 1A, during the mark period, the recording pulse waveform, whose level intermittently varies between the bias level (corresponding to only the current I1) and the write power level (corresponding to the current I1+I3), is obtained.

On the other hand, during the space period, the write pulse generator 152 generates no write pulse. Therefore, the switch SW2 is kept turned off and the current I3 is not supplied to the laser diode 11. Thus, as shown in FIG. 1A, the recording pulse signal is maintained at the bias power level Pb (corresponding to the current I1) during the space period.

(II) APC Control

Next, the APC control will be described. The APC control is executed at the time of reproduction and during the space period at the time of recording, but is not performed during the mark period at the time of recording. The APC control is executed by the APC loop including the laser diode 11, the front monitor diode 16, the buffer 17, the sample-and-hold circuit 14, the APC circuit 13 and the V/I converter 121.

The APC control adjusts the level of the bias current I1 supplied from the LD driver 12 to the laser diode 11 such that the level of the laser light emitted by the laser diode 11 is always maintained at the bias power level Pb. Specifically, out of the space period of the recording data (which is 8-16 modulated and includes the mark period and the space period of the length of 3T to 11T and 14T), in the long space period (e.g., space period of 5T to 11T and 14T), the bias current I1 from the LD driver 12 is adjusted such that the bias power level Pb is constant.

Details of the operations are as follows. The controller 15 generates the recording pulse waveform corresponding to the recording data as described above, and drives the LD driver 12 in accordance with the recording pulse waveform to cause the laser diode 11 to emit the laser light.

The front monitor diode 16 is located in proximity to the laser diode 11 in the optical pickup 2. The front monitor diode 16 receives the laser light emitted by the laser diode 11 to generate the laser power level signal S10 indicating the level of the laser light, and supplies the signal S10 to the sample-and-hold circuit 14 through the buffer 17.

The sample-and-hold circuit 14 samples the laser power level signal S10 supplied by the front monitor diode 16 at the timing given by the sample-and-hold signal S5 supplied by the APC controller 155 in the controller 15, and holds its level for a certain period. The sample-and-hold signal S5 outputted from the controller 15 is a pulse signal indicating the period in which the signal for the APC control is to be generated. Specifically, the sample-and-hold signal S5 is a pulse signal indicating a certain period (a period during which the APC is performed, also referred to as an "APC period" hereafter) in a relatively long space period (e.g., 5T to 11T) in the recording data. Thus, the sample-and-hold circuit 14 samples the level of the laser power level signal S10 in the APC period in the space period of the recording data, and holds and supplies the sampled level to the APC circuit 13 during the period other than the APC periods.

The APC target value S4 is supplied from the APC controller 155 in the controller 15 to the APC circuit 13. The APC target value S4 indicates the level of the laser light to be maintained by the APC. In the present case, the APC target value S4 corresponds to the bias power level Pb. The APC circuit 13 supplies the control signal S12 to the V/I converter 121 in the LD driver 12 in order to maintain the level of the laser power level signal S10 in the APC periods at a certain level indicated by the APC target value S4. The V/I converter 121 converts the voltage indicated by the inputted control signal S12 into a current, and outputs the bias current I1.

At the time of the space period during the recording and at the time of the reproduction, the laser diode 11 is driven by the current I1 corresponding to the bias power level Pb, and outputs the laser light at the bias power level Pb. When the output level of the laser light outputted by the laser diode 11 is varied due to the temperature and the like, the APC loop operates so as to absorb the variation quantity, and varies the bias current I1. As a result, in the space period, a light output waveform is always maintained at the bias power level Pb by the APC.

(III) Recording Pulse Waveform Control

Next, the description will be given of the control of the recording pulse waveform. In the present embodiment, the shape of the recording pulse wave form is controlled by the control signals S21 to S23 supplied to the recording circuit 10 by the controller 40. As described above, in accordance with the variation of the bias power level Pb, the controller 40 varies the shape of the recording pulse waveform.

Concretely, first, the controller 40 supplies the write power control signal S23 indicating the write power level Pw (see FIGS. 1A and 1B) to the recording level controller 154. The recording level controller 154 sets the write power level Pw to the level indicated by the write power control signal S23.

The controller 40 supplies the bias power control signal S21 indicating the bias power level Pb to the APC controller 155. The controller 40 can vary the bias power level Pb on the basis of various kinds of reasons. The various kinds of reasons are to set the bias power level to a predetermined value higher than a prescribed value for stabilization of the servo control, and to set the bias power level to the predetermined value lower than the prescribed value for improvement of the recording characteristic, for example. Then, the controller 40 supplies, to the APC controller 155, the bias power control signal S21 indicating the bias power level thus varied. The APC controller 155 outputs the target value S4 in order to maintain the bias power level Pb to the level indicated by the bias power control signal S21 to execute the APC.

At the same time, the controller 40 supplies, to the write pulse generator 152, the pulse-shape control signal S22 which adjusts the pulse-shape in the recording pulse waveform corresponding to the variation of the bias power level indicated by the bias power control signal S21. For example, when the controller 40 outputs, to the APC controller 155, the bias power control signal S21 indicating that the bias power level is increased to be larger than the prescribed value by the predetermined value, the controller 40 supplies, to the write pulse generator 152, the pulse-shape control signal S22 designating that the front edge of the top pulse in the recording pulse waveform is shifted backward by the predetermined quantity accordingly. Thereby, the write pulse generator 152 generates such the recording pulse waveform that the front edge of the top pulse in the recording pulse waveform is shifted backward by the predetermined quantity, and controls the switch SW2 to drive the laser diode 11.

At the time of varying the bias power level Pb, the controller 40 controls the write pulse generator 152 so that the front edge of the pulse (top pulse and/or multi-pulse) in the recording pulse waveform is shifted in accordance with the variation quantity.

Figure 5A:
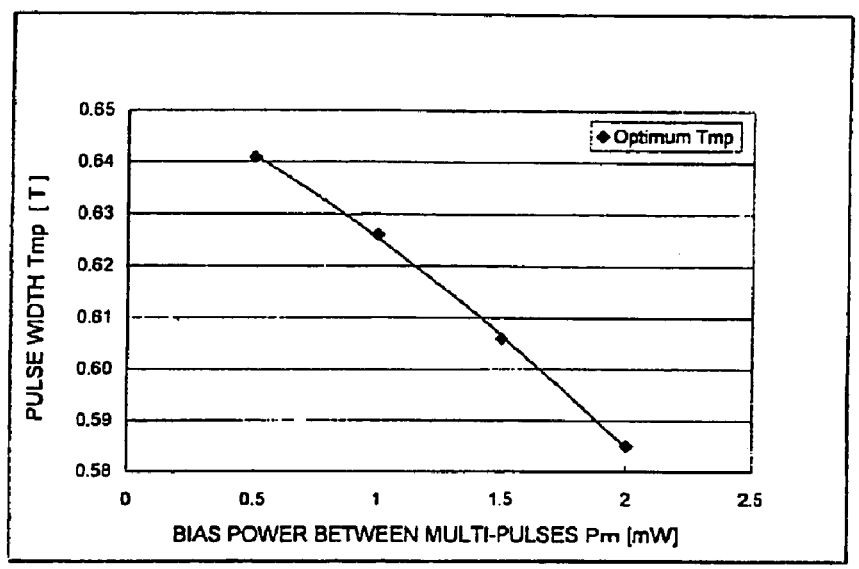
FIG. 5A is a graph showing a relation between a bias between multi-pulses and a multi-pulse width.

As an example, FIG. 5A shows a relation between the bias power Pm of the multi-pulse portion and the multi-pulse width Tmp according to it. In accordance with the increase of the bias power level of the multi-pulse portion, the multi-pulse width Tmp is decreased. Thereby, it can be prevented that the recording characteristic is deteriorated due to the variation of the bias power level.

(IV) Correction of Recording Pulse Waveform

Next, the description will be given of correction of the recording pulse waveform. In the above-mentioned method, the controller 40 varies the bias power level, the front edge position of the recording pulse waveform is varied in order to correspond to the variation. However, actually, it is not always ensured that the recording light is emitted according to the deformation of the recording pulse waveform by the pulse-shape control signal S22 and the expected recording power is irradiated on the disc. For example, the recording power actually irradiated on the disc is sometimes different from the value expected by the controller 40 due to a variation of the laser diode characteristic, a warp of the recording surface of the disc and the like. Therefore, it is preferable that the actual variation of the bias power is monitored directly or indirectly and adjustment of the recording pulse waveform is performed in accordance with the variation quantity. The adjustment can be performed by three methods below. As for the known variation of the bias power incapable of being monitored, the adjustment is performed in advance by a method different from the three methods below.

In a first method, the laser emission power corresponding to the bias power set by the APC controller 155 is detected by using the front monitor diode 16 of the pickup 2, and the laser emission power is fed back to the write pulse generator 152. Thereby, the correction of the recording pulse waveform is performed. Concretely, as shown in FIG. 4, the detecting signal S26 of the sample-and-hold circuit 14 is inputted to the write pulse generator 152, and the write pulse generator 152 performs the correction of the recording pulse waveform in accordance with the detecting signal S26.

In a second method, a return light of the recording laser light irradiated on the disc is used. Concretely, the output signal of the photo detector provided in the pickup 2 may be supplied from the reproduction circuit 20 shown in FIG. 3 to the write pulse generator 152. Since the variation of a thermal effective value of the bias power due to the sensitivity difference of the disc can be detected by the variation of the return light during the recording. Therefore, by correcting the recording pulse waveform based on it, sensitive difference of the disc can be absorbed.

In a third method, a tilt servo control signal generated by the servo control unit 30 shown in FIG. 3 is supplied to the write pulse generator 152. Since a variation of the thermal effective value of the bias power due to the tilt shift can be detected from the tilt servo control signal, by similarly detecting the bias power actually irradiated on the disc, the recording pulse waveform can be corrected.

When the bias power actually irradiated on the disc is detected by any one of the above methods, the correction of the recording pulse waveform is performed based on it. It is assumed that the controller 40 inputs, to the APC controller 155, the bias power control signal S21 increasing the bias power level by the predetermined value, and supplies, to the write pulse generator 152, the pulse-shape control signal S22 designating that the front edge of the top pulse of the recording pulse waveform is shifted by the predetermined quantity, for example. However, when it is found that the bias power level irradiated on the disc is actually increased by only a half due to the characteristic of the laser diode 11 and the warp of the disc, the write pulse generator 152 performs the correction of returning the front edge position of the top pulse of the recording pulse waveform to the original position by only the half. Thereby, the recording can accurately be performed in consideration of the laser power actually irradiated on the disc.

Instead of performing the correction of the recording pulse waveform as described above, the bias power can be varied. In addition, both corrections of the recording pulse waveform and the bias power can be performed.

(V) Correction of Recording Pulse Waveform after Short Space

As described above, basically in accordance with the increase of the bias power level, the adjustment of the recording pulse waveform may be performed. However, when a short mark such as the 3T mark is recorded after a short space such as the 3T space, it is easily affected by a thermal interference. Therefore, it is effective to increase the adjustment quantity of the recording pulse waveform, i.e., the shift quantity of the front edge of the top pulse, after the short space such as the 3T space.

Figure 5B:
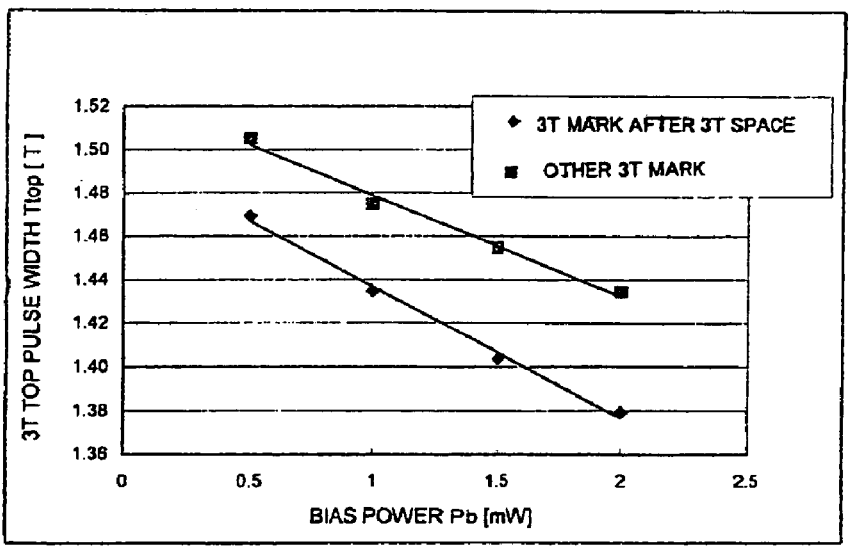
FIG. 5B is a graph showing a relation between a 3T top pulse width and a bias power.

FIG. 5B shows an example of the shift quantity in such a case. Each value such as a pulse width shown in FIGS. 5A to 5C corresponds to each portion shown in FIG. 6. FIG. 5B shows a relation between the bias power Pb and the top pulse width Ttop for the 3T mark after the 3T space and other 3T marks. As shown in FIG. 5B, in the case of the 3T mark after the 3T space, in comparison with other 3T marks, the top pulse width is set to be small with respect to the identical bias power, i.e., the shift quantity of the front edge position backward is set to be large.

Figure 5C:
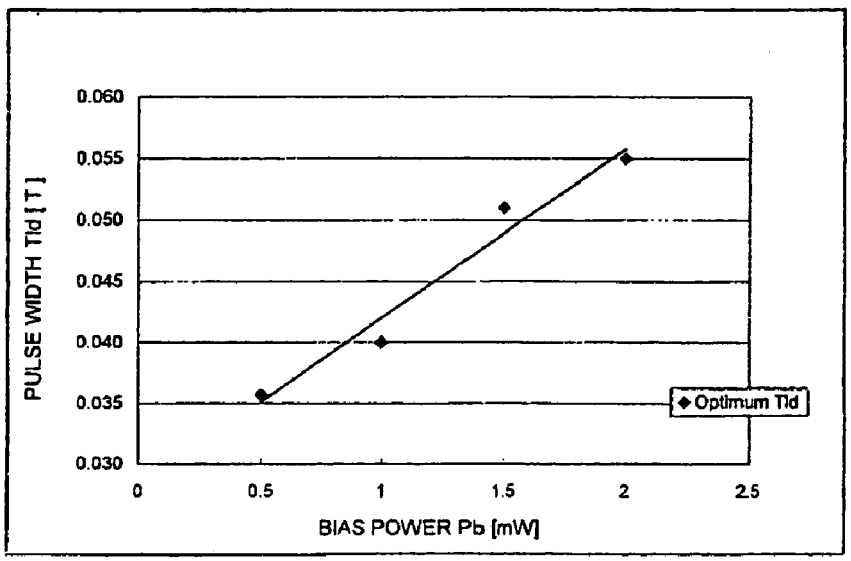
FIG. 5C is a graph showing a difference between a width of a 3T mark after a 3T space and a width of other 3T mark.
Figure 6:
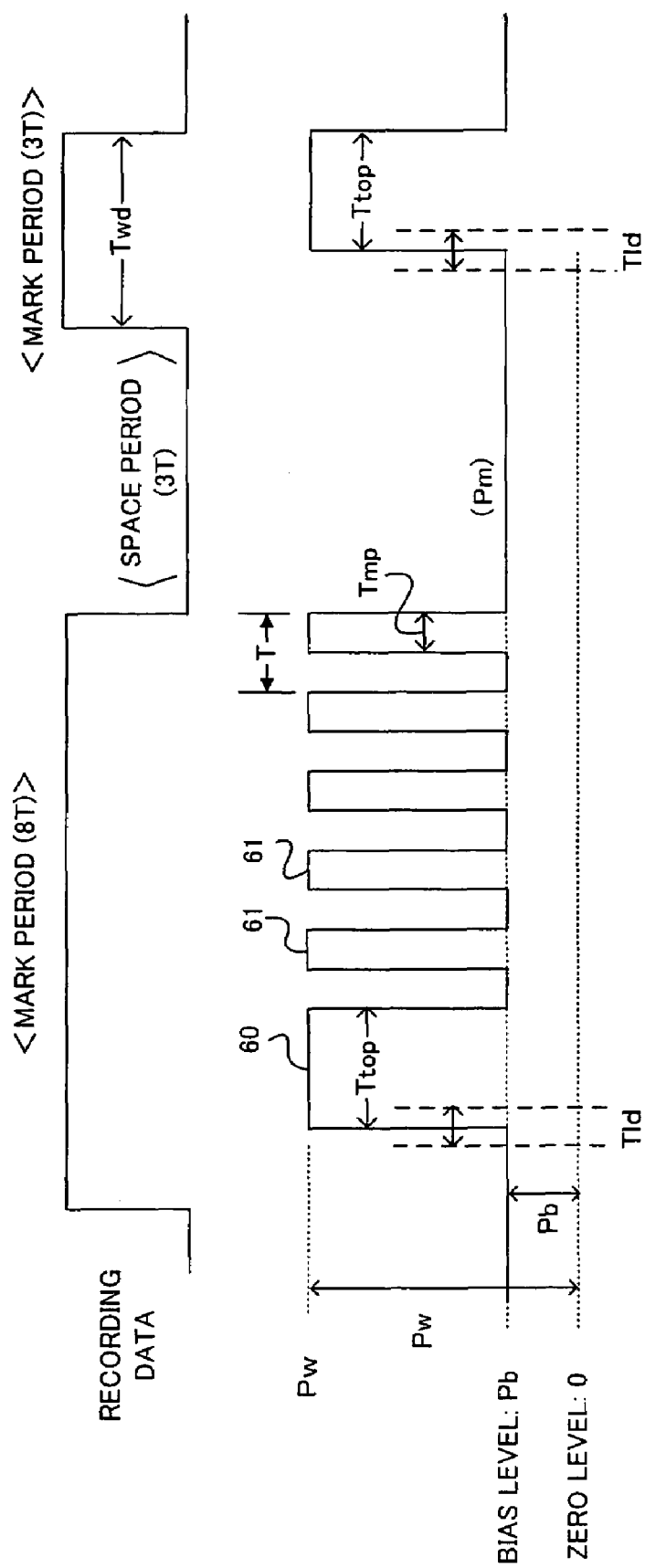
FIG. 6 shows an example of a recording pulse waveform of a multi-pulse type.

FIG. 5C shows differences of appropriate front edge shift quantities Tld of the top pulses for the 3T mark subsequent to the 3T space and other 3T marks, when an identical bias power is set. It is understood that as the 3T bias power becomes higher, it becomes necessary to make a front edge shift quantity Tld of the top pulse much larger. Thereby, the effect of the thermal interference in the case that the bias power is increased in the short space portion such as the 3T space can be decreased.

(VI) Correction Example of Recording Pulse Waveform

Next, the description will be given of another correction example of the recording pulse waveform. In the above explanation, the description was given of such the method that the front edge of the top pulse and/or the multi-pulse of the recording pulse waveform is shifted backward in accordance with the increase of the bias power level. However, if the sum of a heat quantity by the entire recording pulse waveform can be decreased and/or increased in accordance with the quantity of increase and/or decrease of the bias power level, the recording pulse waveform can be corrected by the methods other than the method of shifting the front edge of the top pulse. Some examples including such case are shown below.

Figure 7:
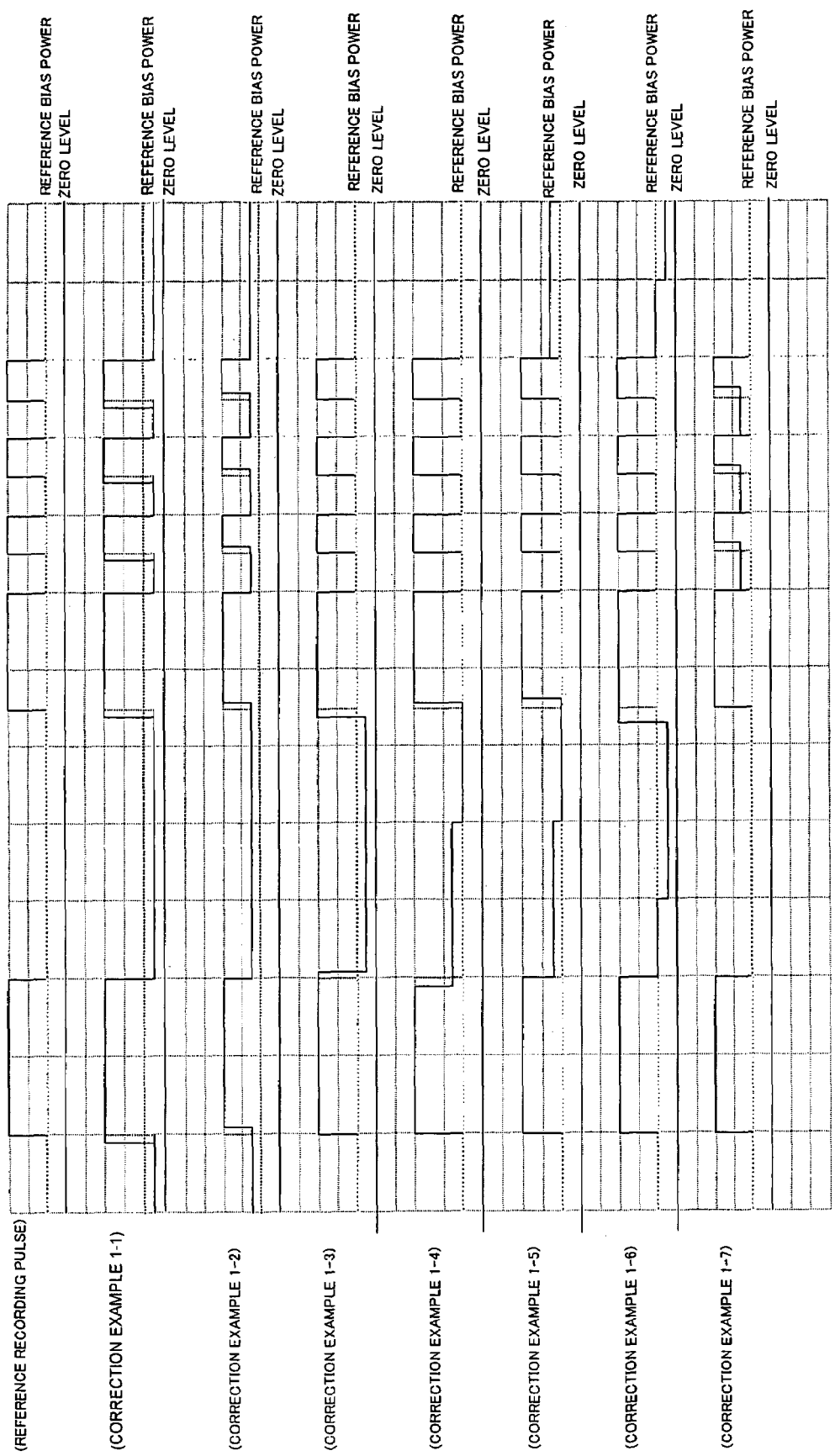
FIG. 7 shows a correction example of the recording pulse waveform of the multi-pulse type.

FIG. 7 shows correction examples in a case that the write strategy of the multi-pulse type is used.

The correction examples 1-1 and 1-2 are the above-described methods. In the correction example 1-1, since the bias power level is lower than a reference bias power level, the front edges of the top pulse and the multi-pulse are shifted forward correspondingly. Conversely, in the correction example 1-2, since the bias power level is higher than the reference bias power level, the front edges of the top pulse and the multi-pulse are shifted backward.

In a correction example 1-3, since only the bias power level in the space period is lower than the reference bias power level, a back edge of the top pulse in the pulse waveform before the space period is shifted backward, and the front edge of the top pulse in the pulse wave form following the space period is shifted forward. Since the bias power level in the multi-pulse portion is equal to the reference bias power level, the multi-pulse does not vary.

In a correction example 1-4, since the bias power level in the space period after the recording pulse is high for a certain period, the back edge of the recording pulse is shifted forward, and the front edge of the next recording pulse is shifted backward.

In a correction example 1-5, since the bias power level in the space period after the recording pulse is high for a certain period, the front edge of the next recording pulse is shifted backward.

In a correction example 1-6, since the bias power level in the space period before the recording pulse is low for a certain period, the front edge of the top pulse of the recording pulse is shifted forward.

In a correction example 1-7, since the bias power level of the multi-pulse portion is high, the front edge of each multi-pulse is shifted backward respectively.

Figure 8:
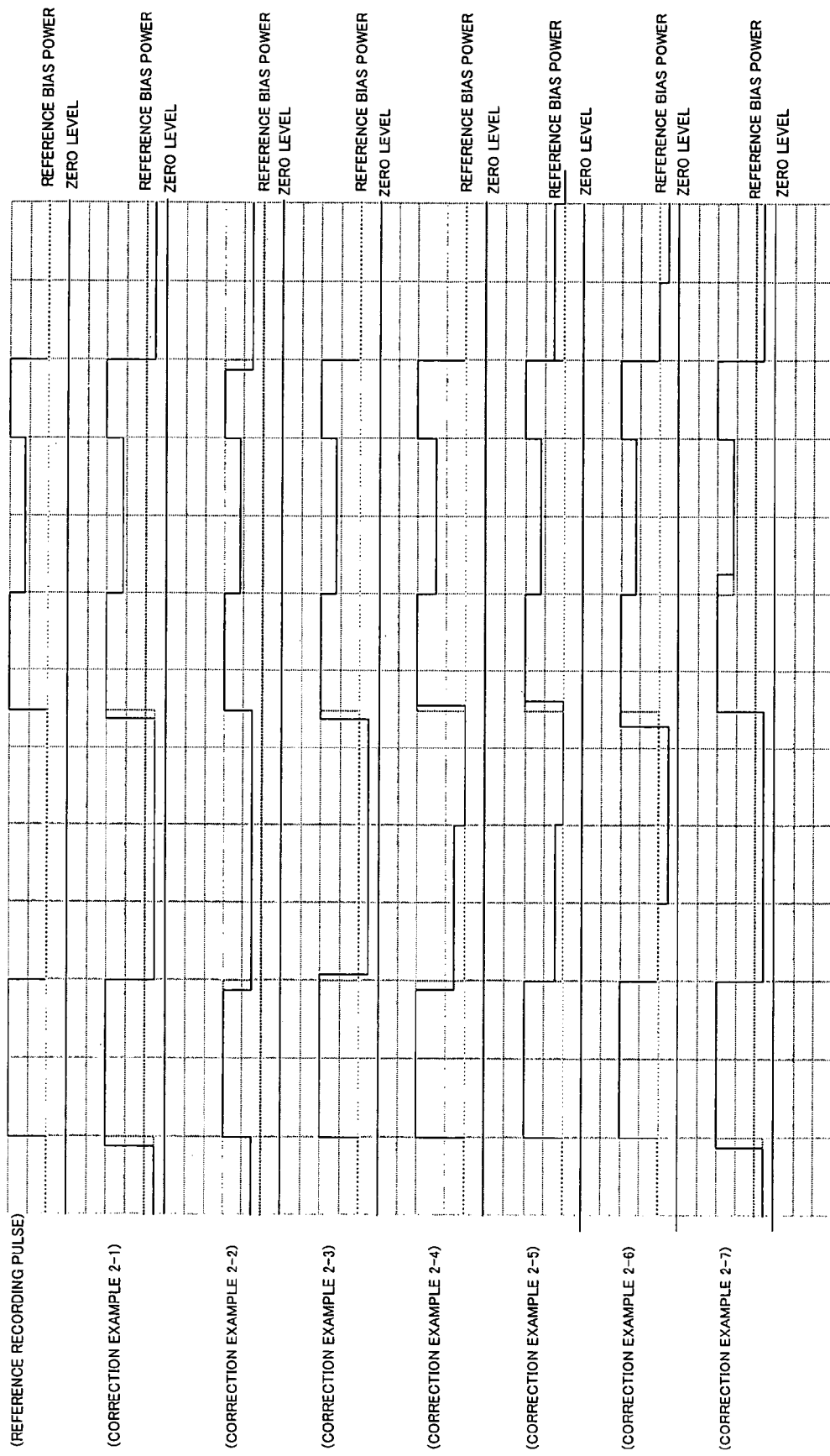
FIG. 8 shows a correction example of the recording pulse waveform of a non-multi-pulse type.

On the other hand, FIG. 8 shows such correction examples that a write strategy of a non-multi-type is used.

In a correction example 2-1, since the bias power level is lower than the reference bias power level, the front edge of the top pulse is shifted forward correspondingly. Though FIG. 8 does not show, conversely to the correction example 2-1, when the bias power level in the space period is high, the front edge of the top pulse of the subsequent recording pulse waveform may be shifted backward.

In a correction example 2-2, since the bias power level in the space period is higher than the reference bias power level, the back edge of the last pulse in the recording pulse before the space period is shifted forward.

In a correction example 2-3, since the bias power level in the space period is lower than the reference bias power level, the back edge of the last pulse in the recording pulse before the space period is shifted backward, and the front edge of the top pulse in the recording pulse after the space period is shifted forward.

In a correction example 2-4, since the bias power level in the space period after the recording pulse is high for a certain period, the back edge of the recording pulse is shifted forward, and the front edge of the next recording pulse is shifted backward.

In a correction example 2-5, since the bias power level in the space period after the recording pulse is high for a certain period, the front edge of the next recording pulse is shifted backward.

In a correction example 2-6, since the bias power level in the space period before the recording pulse is low for a certain period, the front edge of the top pulse of the recording pulse is shifted forward.

In a correction example 2-7, since the bias power level in the space period before the recording pulse is low, the back edge of the top pulse of the recording pulse is shifted backward correspondingly (i.e., the intermediate bias period is shortened).

As explained above, in the embodiment of the present invention, the shape of the recording pulse waveform is varied in accordance with the variation of the bias power. Therefore, the total heat quantity of the recording laser light irradiated on the disc as a whole can be maintained, and a preferable recording characteristic can be maintained.

INDUSTRIAL APPLICABILITY

The information recording apparatus and the information recording method according to the present invention can be utilized when the information is recorded on the optical disc by using the laser light.

The invention claimed is:

1. An information recording apparatus which irradiates a laser light on a recording medium and forms recording marks corresponding to recording data, comprising:
    a light source which emits the laser light;
    a recording waveform generating unit which generates a recording pulse waveform varying between a bias power level and a write power level based on the recording data; and
    a recording unit which drives the light source based on the recording pulse waveform to form the recording marks on the recording medium,
    wherein the recording waveform generating unit adjusts an edge position of a pulse portion having the write power level in the recording pulse waveform in accordance with the bias power level, such that as the bias power level increases or decreases from a predetermined value, the edge position of the write power level has a corresponding left or right movement.

2. The information recording apparatus according to claim 1, wherein the recording waveform generating unit comprises:
    a level determining unit which determines the bias power level; and
    an adjustment unit which compares the bias power level with a predetermined reference level and adjusts the edge position based on a comparison result.

3. The information recording apparatus according to claim 2, wherein the adjustment unit shifts a front edge of the pulse portion backward when the bias power level is higher than the reference level, and shifts the front edge of the pulse portion forward when the bias power level is lower than the reference level.

4. The information recording apparatus according to claim 1, wherein the recording pulse waveform comprises a top pulse, and wherein the recording waveform generating unit adjusts a front edge position of the top pulse.

5. The information recording apparatus according to claim 4, wherein the recording pulse waveform further comprises one or more multi-pulse, and wherein the recording waveform generating unit adjusts a front edge position of each multipulse.

6. The information recording apparatus according to claim 1, wherein the recording waveform generating unit adjusts the edge position of the pulse portion to vary a pulse width of the pulse portion.

7. The information recording apparatus according to claim 1,
    wherein the recording pulse waveform comprises one top pulse and one or more multi-pulse, and
    wherein the recording waveform generating unit adjusts the front edge position of the top pulse in accordance with a level in a period before the top pulse, and adjusts each front edge position of the plural multi-pulses in accordance with the level between the plural multi-pulses.

8. An information recording method executed in an information recording apparatus which irradiates a laser light on a recording medium to form recording marks according to recording data, comprising:
    a recording waveform generating process which generates a recording pulse waveform varying between a bias power level and a write power level based on the recording data; and
    a recording process which drives a light source based on the recording pulse waveform to form the recording marks on the recording medium,
    wherein the recording waveform generating process adjusts an edge position of a pulse portion having the write power level in the recording pulse waveform in accordance with the bias power level, such that as the bias power level increases or decreases from a predetermined value, the edge position of the write power level has a corresponding left or right movement.

9. An information recording apparatus which irradiates a laser light on a recording medium and forms recording marks corresponding to recording data, comprising:
    a light source which emits the laser light;
    a recording waveform generating unit which generates a recording pulse waveform varying between a bias power level and a write power level based on the recording data; and
    a recording unit which drives the light source based on the recording pulse waveform to form the recording marks on the recording medium,
    wherein the recording waveform generating unit adjusts an edge position of a pulse portion having the write power level in the recording pulse waveform in accordance with the bias power level, such that as the bias power level increases from a predetermined value, the front edge position of the write power level moves right and as the bias power level decreases from a predetermined value, the front edge position of the write power level moves left.

* * * * *